US 12,009,723 B2

(12) United States Patent
Vanhee et al.

(10) Patent No.: US 12,009,723 B2
(45) Date of Patent: Jun. 11, 2024

(54) ELECTRIC MOTOR WITH WATER JACKET AND OIL-COOLED STATOR AND METHOD FOR OPERATION OF THE ELECTRIC MOTOR

(71) Applicant: Dana Automotive Systems Group, LLC, Maumee, OH (US)

(72) Inventors: Steven Vanhee, Hooglede (BE); Joachim Druant, Houthulst (BE); Thibault Devreese, Ghent (BE); Luke Miller, Montreal (CA)

(73) Assignee: DANA AUTOMOTIVE SYSTEMS GROUP, LLC, Maumee, OH (US)

( * ) Notice: Subject to any disclaimer, the term of this patent is extended or adjusted under 35 U.S.C. 154(b) by 136 days.

(21) Appl. No.: 17/448,322

(22) Filed: Sep. 21, 2021

(65) Prior Publication Data
US 2023/0093220 A1 Mar. 23, 2023

(51) Int. Cl.
  *H02K 5/20* (2006.01)
  *H02K 9/19* (2006.01)
(52) U.S. Cl.
  CPC ............... *H02K 5/203* (2021.01); *H02K 9/19* (2013.01)
(58) Field of Classification Search
  CPC .................................. H02K 9/19; H02K 9/20
  USPC ......................................... 310/260, 270, 400
  See application file for complete search history.

(56) References Cited

U.S. PATENT DOCUMENTS

| | | | | |
|---|---|---|---|---|
| 6,323,613 B1* | 11/2001 | Hara | ...................... | H02K 16/00 903/952 |
| 7,775,060 B2* | 8/2010 | Nakajima | ................. | B60L 1/02 62/505 |
| 8,492,952 B2* | 7/2013 | Bradfield | ............... | H02K 5/203 310/216.011 |
| 8,519,577 B2* | 8/2013 | Stiesdal | ................... | H02K 1/20 310/58 |
| 9,964,019 B2* | 5/2018 | Gopal | ........................ | F01P 3/20 |
| 10,272,767 B1* | 4/2019 | Tang | ........................ | F01P 5/10 |
| 2002/0074874 A1 | 6/2002 | Tong et al. | | |
| 2009/0206687 A1* | 8/2009 | Woody | ..................... | H02K 9/20 62/99 |

(Continued)

FOREIGN PATENT DOCUMENTS

| | | | | |
|---|---|---|---|---|
| CN | 103155382 A | * | 6/2013 | ............... H02K 1/20 |
| CN | 111869058 A | * | 10/2020 | |

(Continued)

OTHER PUBLICATIONS

CN-111869058-A Machine Translation (Year: 2020).*

(Continued)

*Primary Examiner* — Tran N Nguyen
*Assistant Examiner* — Masoud Vaziri
(74) *Attorney, Agent, or Firm* — McCoy Russell LLP

(57) ABSTRACT

Systems and methods for cooling an electric motor in an electric drive unit are provided. In one example, the electric drive unit includes electric motor with a housing with a water jacket arranged therein, a stator that includes a plurality of stator laminations positioned within the housing, and an oil inlet mounted to and extending through the housing. The plurality of stator laminations includes a radial opening that is designed to receive oil from the oil inlet and direct oil to one or more oil ducts that axially extend through at least a portion of the plurality of stator laminations.

16 Claims, 4 Drawing Sheets

(56) References Cited

U.S. PATENT DOCUMENTS

| | | | | |
|---|---|---|---|---|
| 2012/0262013 A1* | 10/2012 | Chamberlin | ............ | H02K 5/203 29/596 |
| 2014/0197701 A1 | 7/2014 | Hossain et al. | | |
| 2017/0063182 A1* | 3/2017 | Heilman | ................ | H02K 5/203 |
| 2017/0237306 A1* | 8/2017 | Juris | ...................... | H02K 3/522 310/52 |
| 2018/0054094 A1* | 2/2018 | Dlala | ...................... | H02K 1/14 |
| 2018/0054097 A1* | 2/2018 | Dlala | ...................... | H02K 9/19 |
| 2018/0123409 A1* | 5/2018 | Rogginger | .............. | B02C 23/00 |
| 2019/0003572 A1 | 1/2019 | Dellal et al. | | |
| 2019/0006914 A1* | 1/2019 | Graves | ................ | F16H 57/0457 |
| 2019/0312488 A1 | 10/2019 | Latulipe et al. | | |
| 2020/0072244 A1* | 3/2020 | Baumann | ................ | F04D 29/26 |
| 2020/0204044 A1 | 6/2020 | Lee et al. | | |
| 2020/0398871 A1* | 12/2020 | Kueter | ................... | B61D 17/02 |
| 2021/0075274 A1 | 3/2021 | Druant et al. | | |
| 2021/0129660 A1* | 5/2021 | Bradfield | ............... | H02K 7/116 |
| 2021/0220585 A1* | 7/2021 | Tang | ................. | A61M 16/0069 |
| 2021/0281143 A1* | 9/2021 | Lambourg | ............... | H02K 9/19 |
| 2021/0384801 A1* | 12/2021 | Oh | ........................... | H02K 1/32 |
| 2022/0316581 A1* | 10/2022 | Li | ......................... | F16H 57/045 |

FOREIGN PATENT DOCUMENTS

| | | | |
|---|---|---|---|
| CN | 212367066 U * | 1/2021 | |
| DE | 102009009819 A1 | 8/2010 | |
| WO | WO-2012050741 A2 * | 4/2012 | ............ H02K 1/185 |
| WO | 2017161527 A1 | 9/2017 | |

OTHER PUBLICATIONS

CN-103155382-A Machine Translation (Year: 2013).*
CN 212367066 U Machine Translation (Year: 2021).*
Silwal, E. et al., "Assessment of Different Cooling Techniques for Reduced Mechanical Stress in the Windings of the Electrical Machines," Energies, vol. 12, No. 10, May 2019, 18 pages.

* cited by examiner

ELECTRIC MOTOR WITH WATER JACKET AND OIL-COOLED STATOR AND METHOD FOR OPERATION OF THE ELECTRIC MOTOR

TECHNICAL FIELD

The present description relates generally to systems and methods for cooling an electric drive unit.

BACKGROUND AND SUMMARY

Previous electric motors in electric drive units such as electric axles, have used cooling systems to avoid high operating temperatures. In certain prior motors, efforts have been made to incorporate oil cooling channels into the stator. These prior cooling systems have used external heat exchangers for cooling the oil. In some of the prior cooling systems, the heat exchanger may significantly contribute to the weight and volume of the system. Other previous electric motors have utilized water jackets in an attempt to meet motor cooling demands.

US 2019/0312488 A1 to Latulipe et al., for instance, teaches an electric motor provided with an enclosed cooling assembly and an open cooling assembly. The enclosed cooling assembly has an oil pump that is provided at one end of an electric machine casing for circulating oil through a sealed enclosure. On the other hand, the open cooling assembly has an external pump for circulating coolant through an outer portion of the casing.

The inventors have recognized several issues with Latulipe's cooling system. For instance, the cooling system disclosed by Latulipe does not directly cool the stator, but rather relies on the water jacket positioned around the stator for indirect stator cooling. Latulipe's cooling system may therefore exhibit space inefficiencies. The bulky cooling system may pose packaging difficulties in certain space-constrained electric axles, for instance. Thus, a more space-efficient system for cooling an electric motor may be desired.

To resolve at least some of the aforementioned issues, the inventors have developed an electric drive unit that includes an electric motor. The electric motor, in one example, includes a housing with a water jacket arranged therein and a stator with a plurality of stator laminations that are positioned within the housing. The electric motor further includes an oil inlet that is mounted to and extends through the housing. The stator laminations have a radial opening that are designed to receive oil from the oil inlet and direct the oil into at least one oil duct. In the motor, the oil duct axially extends through at least a portion of the stator laminations. By flowing coolant through the water jacket in the housing, the oil may be efficiently cooled without the use of an external heat exchanger, if desired. Consequently, the motor's cooling arrangement may exhibit greater compactness than previous motor cooling systems, in some instances. Further, by omitting a heat exchanger for the oil cooling circuit, the electric motor may be more efficiently manufactured, if wanted.

As one example, to enhance cooling of the stator, the oil channels formed through stator laminations may have a baffled profile. The baffles in the oil channels increase the contact area and thus the heat transfer coefficient. In yet another example, a thermal interface material may be provided between the stator and the housing, thereby increasing the amount of heat transferred from the oil channels to the water jacket. Consequently, the motor may be more effectively cooled in a space efficient arrangement.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE FIGURES

FIGS. 2-6 are drawn approximately to scale. However, other relative component dimensions may be used, in alternate embodiments.

DETAILED DESCRIPTION

The following description relates to a cooling system for an electric motor that combines direct stator cooling and water jacket cooling. In this combined cooling system, the water jacket effectively acts as a heat exchanger for an oil cooling arrangement in the stator. The electric motor specifically includes a housing with a water jacket disposed therein. The stator of the electric motor includes a stack of stator laminations that are formed with oil ducts which axially traverse the lamination stack. The stator laminations also include a radial opening that is designed to receive oil from an oil inlet. The oil inlet is mounted to and extends through the housing, such that oil received in the radial opening is directed into the oil ducts. By providing a water jacket proximal to the oil ducts in the stator, the system may efficiently provide oil to water heat transfer capabilities in a space efficient arrangement.

Figure 1:
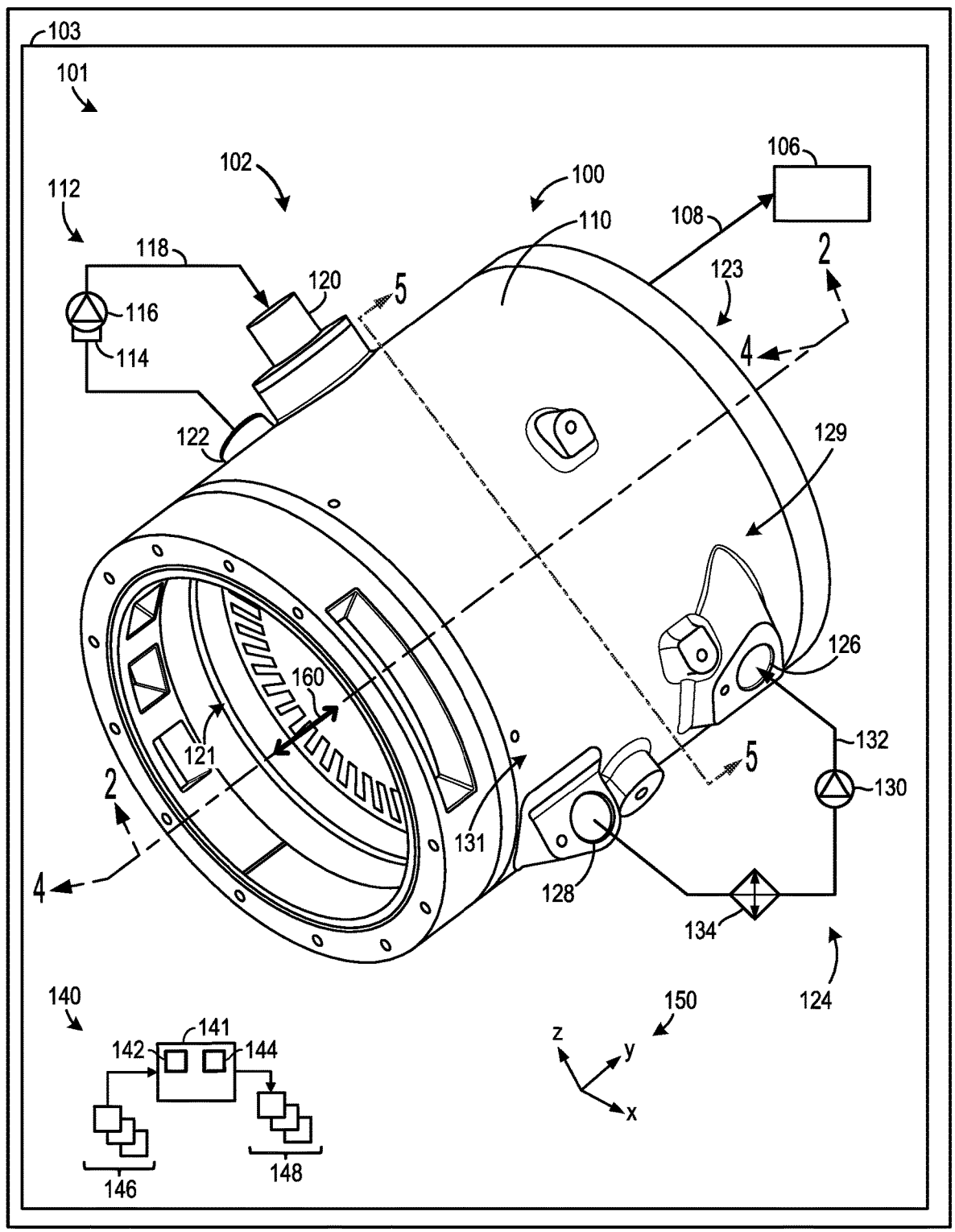
FIG. 1 shows an electric motor with a cooling system.
Figure 2:
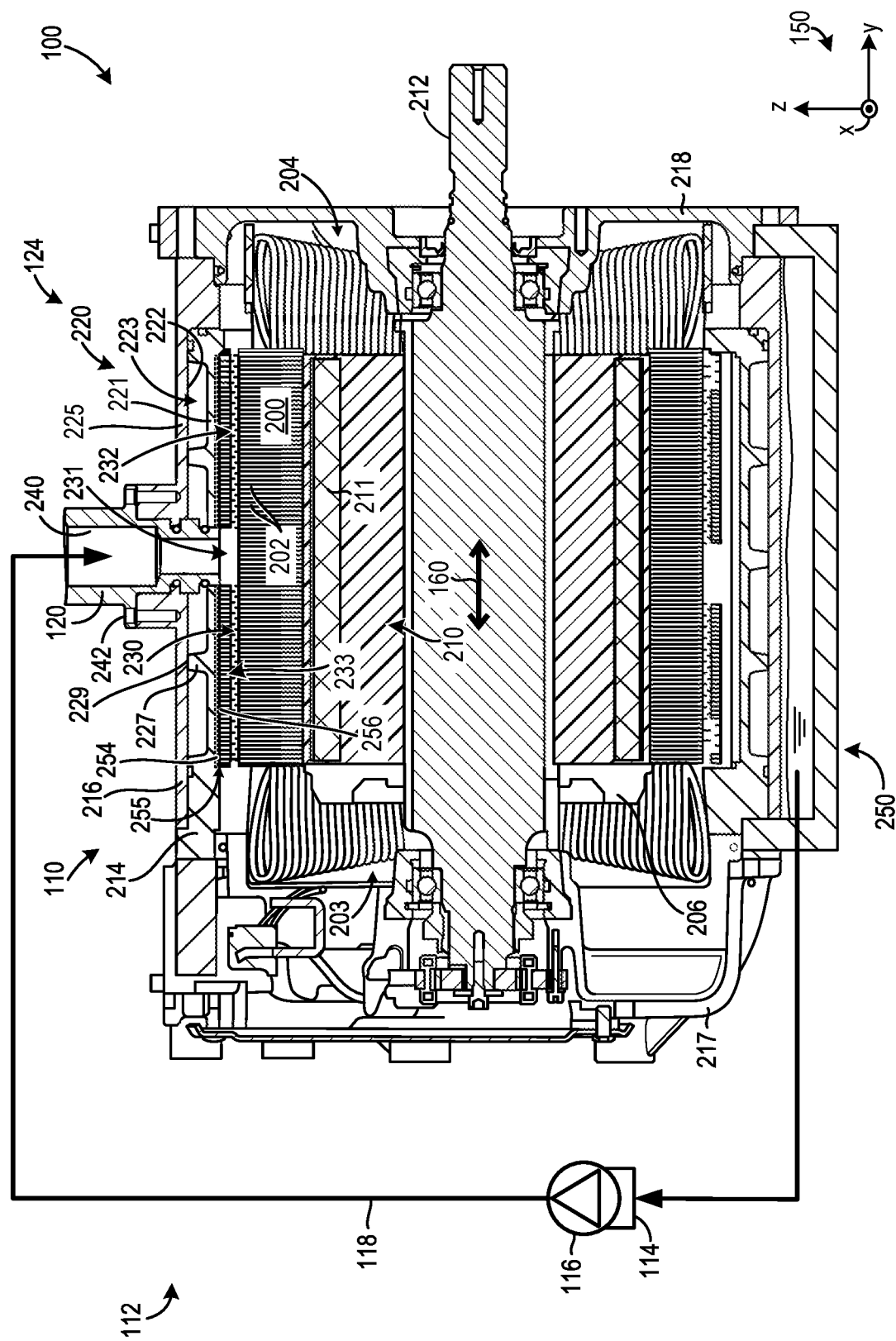
FIG. 2 shows a cross-sectional view of the electric motor depicted in FIG. 1.
Figure 3:
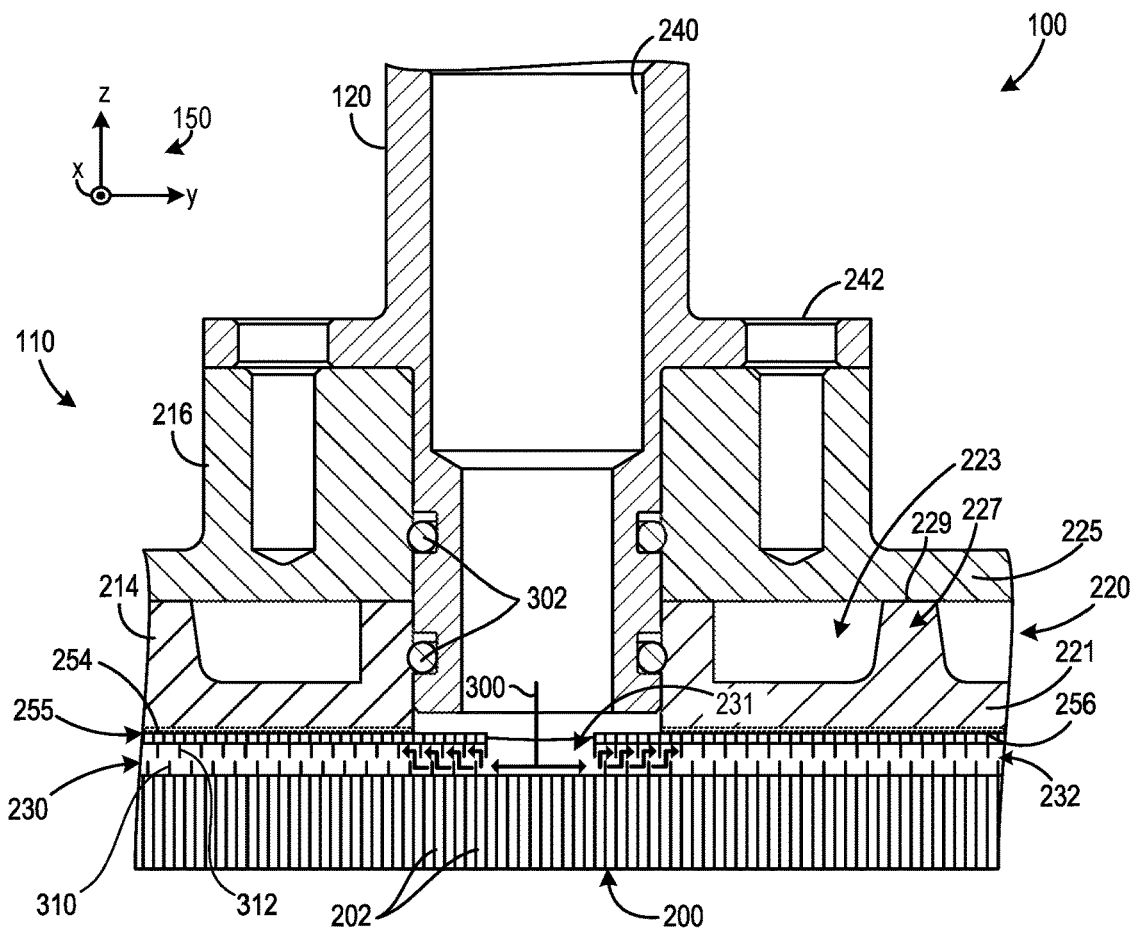
FIG. 3 shows a detailed view of a portion of the electric motor depicted in FIG. 2.

FIG. 1 schematically illustrates a cooling system for an electric motor. FIG. 2 shows the electric motor and cooling system with a water jacket and oil ducts formed in a stator of the electric motor. FIG. 3 depicts a portion of the electric motor housing where an oil inlet is mounted. FIG. 4 again depicts the fluid passages of the water jacket and the oil ducts formed in the stator. FIG. 5-6 show an axial cross-section of the electric motor.

FIG. 1 illustrates an electric drive unit 101 with an electric motor 100 (e.g., an electric motor-generator). FIG. 1 further schematically depicts a cooling system 102 for the electric motor. The electric drive unit 101 may additionally include a gearbox, an inverter, and/or other suitable components. The electric motor 100 and cooling system 102 may reside in an electric drive of a vehicle 103 or other suitable system. In such examples, the vehicle may take a variety of forms in different embodiments, such as a light, medium, or heavy duty vehicle. Alternatively, the motor may be used in other suitable systems, such as systems in manufacturing facilities or other industrial settings.

In some examples, in addition to the electric motor 100, the vehicle 103 may further include another motive power source, such as an internal combustion engine (ICE) (e.g., a spark and/or compression ignition engine) or other suitable devices designed to generate rotational energy. The internal combustion engine may include conventional components such as cylinders, pistons, valves, a fuel delivery system, an intake system, an exhaust system, and the like. Further, the electric motor 100 may include components for generating mechanical power as well as electric power during a regeneration mode, in some cases, such as a housing 110, a stator, a rotor, and the like, the specific structures of which will be further described herein with respect to FIGS. 2-6. Thus, the transmission system 104 and electric motor 100 may be utilized in a hybrid or battery electric vehicle.

In some examples, the electric motor 100 may be designed to provide mechanical power to a downstream component 106 via an output shaft or other suitable mechanical component, represented by an arrow 108. The component 106 may be a transmission, a gearbox in an electric axle, a differential, and the like. Alternatively, the electric motor 100 may be used in equipment other than a vehicle. As such, the component 106 may be a pump, compressor, fan, and the like.

The cooling system 102 may include an oil circuit 112 and a coolant circuit 124 designed for jointly cooling the electric motor 100. It will be appreciated that oil in the oil circuit is fluidly separated from the coolant in the coolant circuit. In one example, the coolant circuit 124 may conceptually function as a heat exchanger for the oil circuit 112, in order to provide a compact arrangement for cooling the electric motor 100. As such, an external heat exchanger for the cooling circuit may be omitted from the system to increase the system's space efficiency, if wanted.

The oil circuit 112 may include a filter 114 and an oil pump 116. The oil pump 116 flows oil (e.g., natural and/or synthetic oil) through an oil delivery line 118 and into the housing 110 via an oil inlet 120. In one example, the oil pump 116 may be designed to pick up oil from an oil sump, which is formed within a lower portion of the housing 110, via an oil outlet 122. In some examples, the pump 116 and the filter 114 may be disposed external to the housing 110 and in fluid communication with the sump and the oil inlet 120 via oil lines. However, in other examples, the pump 116 and the filter 114 may be incorporated in the housing.

In some cases, the oil inlet 120 may be mounted to the housing 110 and extend therethrough, in order to direct oil in to the stator of the electric motor. In other examples, however, the oil inlet 120 may be integrally formed with the housing. In one example, the oil inlet 120 may be mounted to the housing 110 at an upper portion of the housing (e.g., such that an axial passage of the oil inlet is substantially aligned with a gravitational axis), so that oil entering the housing through the oil inlet may be distributed as desired, as will be described in detail herein with reference to FIGS. 2-6, and routed by gravity into the oil sump.

The oil inlet may be positioned at a central location with regard to an axial length of the housing 110, such as at or near a mid-point between a first axial side 121 and a second axial side 123 of the stator and rotor assembly. Arranging the oil inlet at or near the mid-point may enable the stator to be more evenly cooled. However, other arrangements of the oil inlet have been contemplated. For instance, the oil inlet 120 may be located along the housing at a position that is offset from the mid-point between the axial sides of the assembly and closer to one of the axial ends of the housing 110.

Focusing now on the coolant circuit 124 of the cooling system 102, the housing 110 may further include a coolant inlet 126 and a coolant outlet 128 which may, in some cases, be spaced away from the oil inlet 120. For instance, the coolant inlet 126 and coolant outlet 128 may be positioned approximately 180° apart from the oil inlet 120 along a periphery of the housing, in one use-case example. Further, the coolant inlet and outlet may be positioned on opposing axial sides 129, 131, respectively, of the housing 110. However, alternate arrangements of the coolant inlet and outlet have been contemplated.

The coolant circuit 124 may include a pump 130 for circulating coolant from the coolant outlet 128 to the coolant inlet 126 via a coolant delivery line 132. In some examples, the coolant may be water, a water ethylene glycol mixture, and the like. The coolant circuit may further include a heat exchanger 134 (e.g., a radiator) designed for removing heat from the coolant that exits the housing 110 by way of the coolant outlet 128. When the heat exchanger is used in the system, the coolant is returned to the housing (via coolant inlet 126) at a lower temperature by the pump 130. However, in other examples, the heat exchanger may be omitted from the system, and the line through which the coolant is transferred may function to remove heat from the coolant. From the coolant inlet, the coolant travels into a water jacket. In this way, the coolant circuit 124 routes the coolant through the water jacket in the housing 110. Further, the water jacket functions as a heat exchanger for cooling the oil flowing through the oil circuit 112, described in greater detail herein with reference to FIGS. 2-6.

A control system 140 with a controller 141 may further be included in the vehicle 103. The controller may include a processor 142 and memory 144 with instructions stored therein that, when executed by the processor, cause the controller to perform various methods and control techniques described herein. The processor may include a microprocessor unit and/or other types of circuits. The memory may include known data storage mediums, such as random access memory, read only memory, keep alive memory, combinations thereof, and the like.

The controller 141 may receive various signals from sensors 146 positioned in the system 104 and the electric motor 100. Conversely, the controller 141 may send control signals to various actuators 148 at different locations in the system based on the sensor signals. For instance, the controller 141 may send command signals to the oil pump 116 and/or the pump 130 and, in response, the actuator(s) in the pump(s) may be adjusted to alter the flowrate of the oil and/or coolant delivered therefrom. In other examples, the controller may send control signals to the electric motor 100 and, responsive to receiving the command signals, the motor may be adjusted to alter the motor speed. The other controllable components in the system, may be operated in a similar manner with regard to sensor signals and actuator adjustment.

An axis system 150 is provided in FIG. 1, as well as FIGS. 2-6, for reference. The z-axis may be a vertical axis (e.g., parallel to a gravitational axis), the x-axis may be a lateral axis (e.g., horizontal axis), and/or the y-axis may be a longitudinal axis, in one example. However, the axes may have other orientations, in other examples.

Figure 4:
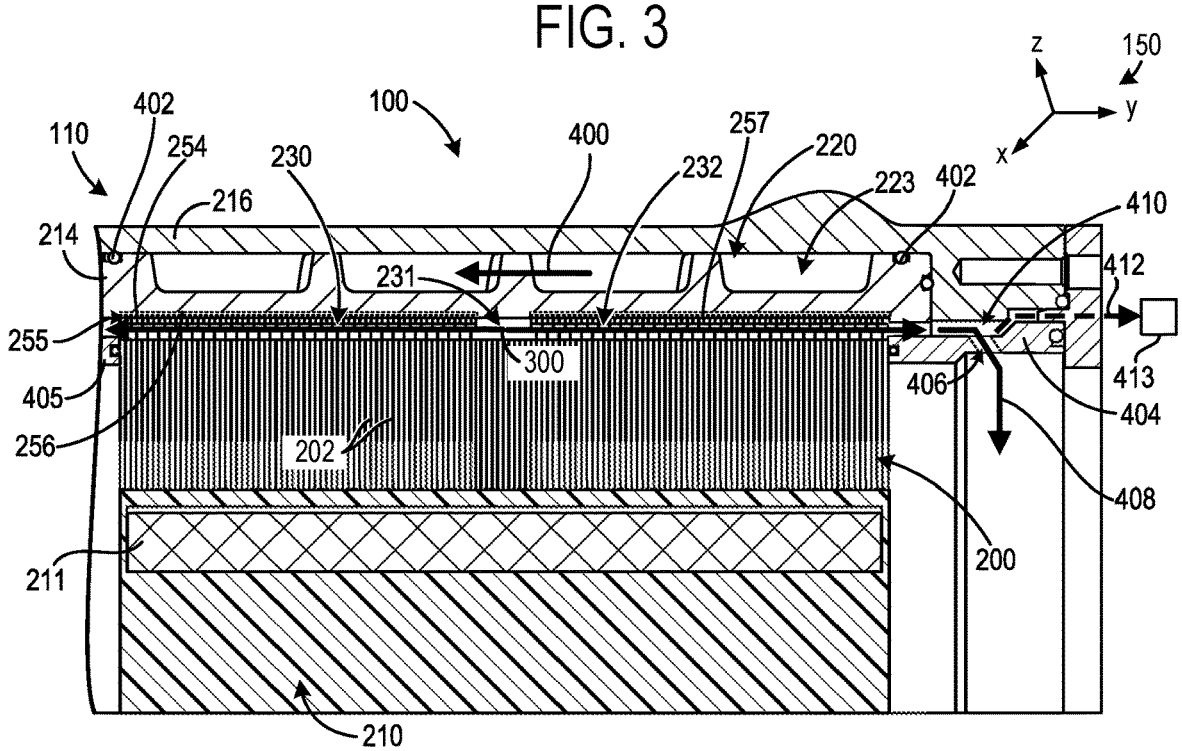
FIG. 4 shows another cross sectional view of the electric motor depicted in FIG. 1.
Figure 5:
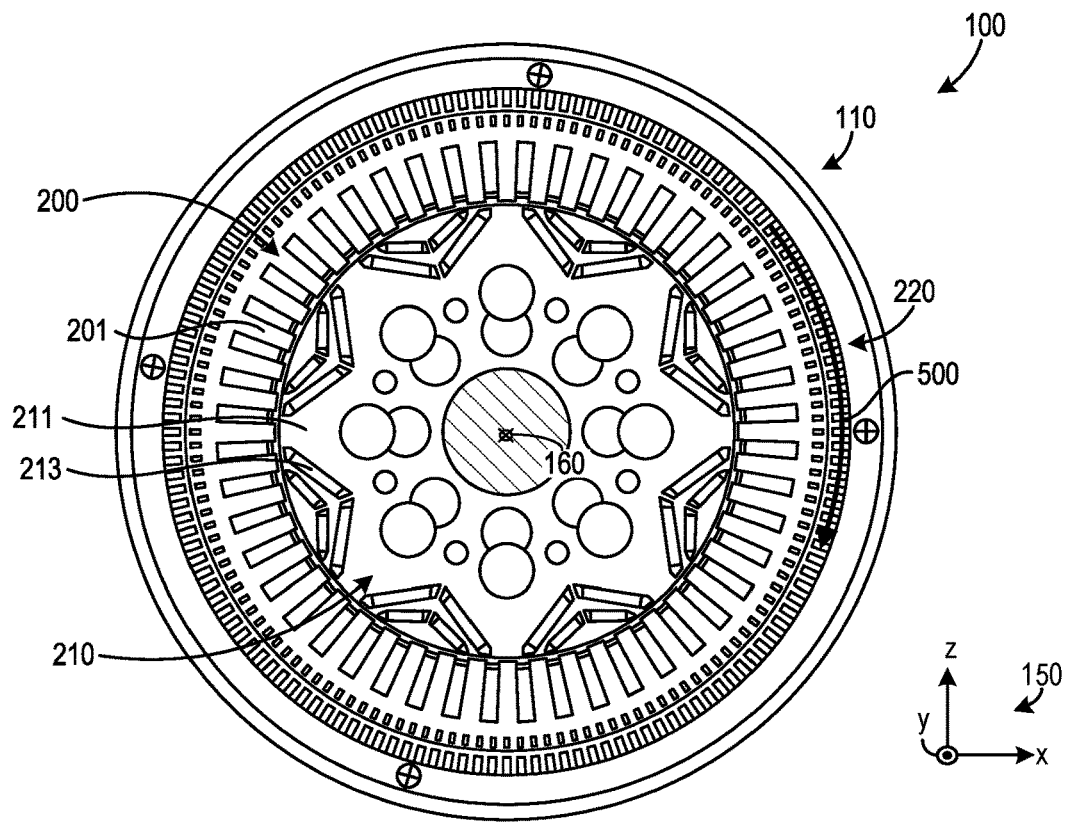
FIG. 5 shows another cross sectional view of the electric motor depicted in FIG. 1.
Figure 6:
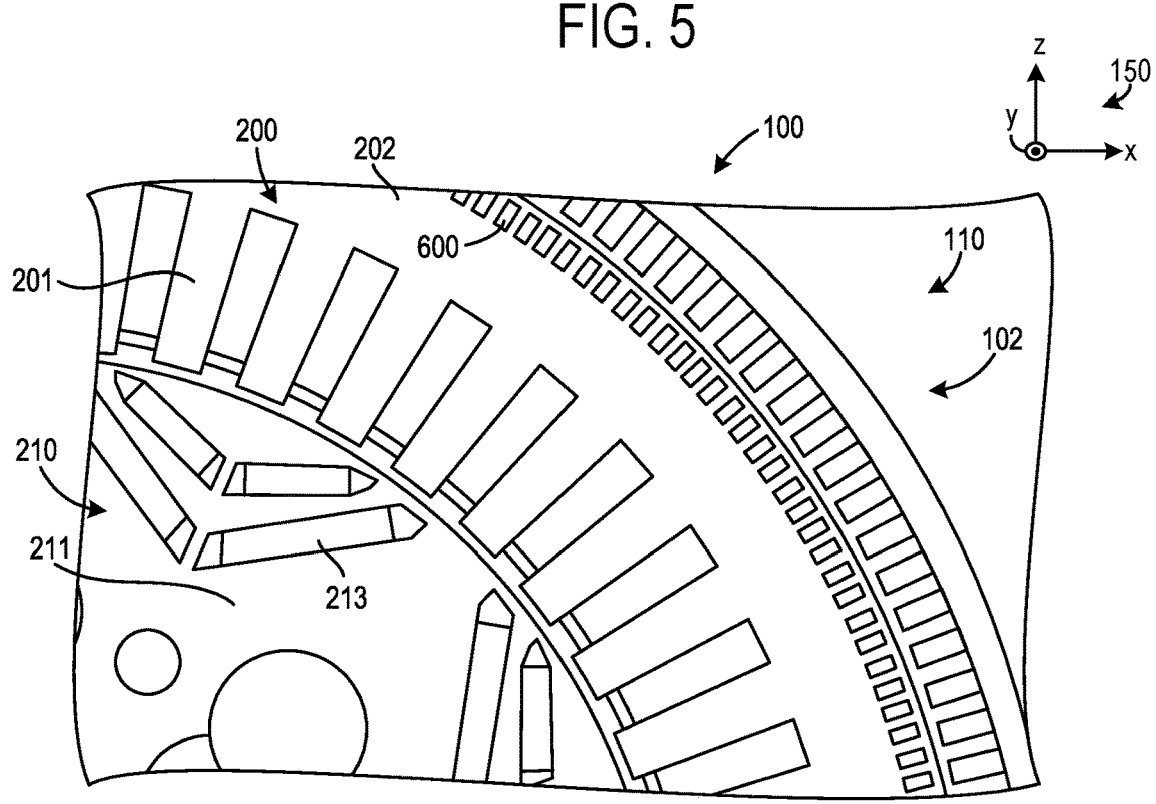
FIG. 6 shows a detailed illustration of a portion of the motor cross-section depicted in FIG. 5.

FIGS. 2-6 show different views of the electric motor 100, the structure of the housing 110, as well as the components of the electric motor enclosed therein. The cross-sectional view shown in FIGS. 2-3 is defined by a lateral cut taken along dashed line 2-2, and the cross-sectional view shown in FIG. 4 is defined by a lateral cut taken along dashed line 4-4.

Thus, the lateral cut planes may pass through a rotational axis 160 of the electric motor 100. The rotational axis 160 is further illustrated in FIGS. 2 and 5, for reference. The cross-sectional views shown in FIGS. 5 and 6 are defined by an axial cut taken along dashed line 5-5 that extends through the rotational axis 160. Thus, structural aspects of the cooling system 102 such as the water jacket of the coolant circuit 124, stator oil channels, are depicted in FIGS. 2-6, and details of the cooling system 102 are expanded upon accordingly.

FIG. 2 specifically shows the electric motor 100 including a stator 200 and a rotor 210 that are enclosed in the housing 110. The rotor 210 is positioned within the stator 200 and coaxial thereto. The stator 200 may include a plurality of stator laminations 202, formed as a stack of laminated plates, and a plurality of stator coils wound through the laminated stack to form end windings. For example, the end windings 203, 204, illustrated in FIG. 2, may be coiled around teeth 201 shown in FIGS. 5-6. The stator laminations 202 may be constructed out of steel (e.g., electrical steel, silicon steel, and the like). The housing 110 may be constructed out of a metal such as steel, aluminum, combinations thereof, and the like. In one particular example, the housing 110 may be constructed out of an aluminum alloy. Further, in one example, the housing 110 may include an inner housing portion 214 joined to an outer housing portion 216, which may, in some examples, be constructed out of a similar material or different materials, in different examples.

In one example, the electric motor 100 may further include one or more balancing plates 206. Specifically, as illustrated in FIG. 2, the balancing plate 206 is positioned on one axial side of the rotor 210 (e.g., the rotor lamination stack). The balancing plate 206 may be attached to the rotor shaft 212 adjacent to the rotor. In other examples, however, another balancing plate may be positioned on an opposing axial side of the rotor, such that a rotor core 211 may be interposed between the balancing plates. Further, the balancing plate(s) may serve to fine tune the rotor's rotational mass balance and reduce the chance of imbalances that may decrease motor efficiency and/or lead to premature degradation of components thereof, in some cases.

The rotor 210 may include a rotor core 211. In embodiments where the electric motor 100 is a permanent magnet AC motor, the rotor core 211 may include permanent magnets 213, shown in FIGS. 5 and 6, that are embedded within rotor laminations of the rotor core 209. However, in other examples, the permanent magnets may be surface-mounted on the rotor laminations.

Continuing with FIG. 2, a rotor shaft 212 permits rotational energy to be transferred from the motor to an external device (e.g., transmission, differential, and the like) or vice versa. Further, covers 217 and 218 may be coupled to the housing 110 at opposing axial ends (e.g., via bolts, screws, and/or other suitable attachment devices), wherein at least one of the covers 218 may include an opening through which the rotor shaft 212 extends.

The electric motor 100 utilizes the cooling system 102 which combines the cooling effects of the coolant circuit 124 with direct stator cooling via the oil circuit 112, to strategically use coolant circulation through a water jacket 200, in the housing 110, to remove heat from the oil.

Thus, the coolant circuit 124 may include the water jacket 220 which is formed within the housing 110. The water jacket 220 has coolant channels 223 formed between the inner housing portion 214 and the outer housing portion 216. In some examples, one or more coolant channels 223 may be located between a wall 221 of the inner housing portion 214 and a wall 225 of the outer housing portion 216. To elaborate, the coolant channels 223 may be bounded by interior surfaces of extensions 227, the inner wall 221, and the outer wall 225. The extensions 227 may specifically project radially outwards toward the outer wall 225. A portion of the interior surface 222 of the outer wall 225, shown in both FIGS. 2 and FIG. 3, may be in face sharing contact with the peripheral surfaces 229 of the extensions 227.

As shown in FIG. 2, the coolant channels 223 may collectively form a spiraling coolant conduit for moving the coolant through the housing 110. Providing a water jacket with spiraling coolant channels enables a greater heat transfer surface in contact with the coolant flowing therethrough. As indicated by arrow 500, depicted in FIG. 5, the flow path of the coolant within the water jacket 220 in the housing 110 may generally flow circumferentially around the stator 200. However, in other examples, the water jacket may include coolant conduits that axially traverse the housing in addition or as an alternative to the spiraling coolant channels.

Continuing with FIG. 2, in order to effect direct stator cooling, the stator 200 may include one or more oil ducts 230, 232. The oil ducts extend through at least a portion of the stator laminations 202. The oil ducts 230, 232 may be formed in the stator laminations, by aligning (or partially aligning) openings formed in adjacent laminations in the stator laminations 202, so that when the stator laminations are pressed together, the opening(s) will form the oil ducts 230, 232 which generally axially traverse the lamination stack.

Heat is transferred from the oil ducts 230, 232, through an outer portion 233 of the laminations 202, to the inner wall 221 of the housing 110. From the inner wall, heat is transferred to the coolant in the channels 223. A peripheral surface of the laminations may therefore be in face sharing contact with an inner surface of the housing. In this way, heat is efficiently conducted from the oil to the coolant.

Each of the stator laminations 202 may include at least one of these openings. Specifically, each lamination may include multiple openings positioned around its circumference. The openings in the sequential laminations may be aligned so as to provide multiple oil ducts that axially traverse the stator 200. To elaborate, the openings may be cutouts in the laminations. FIG. 6 specifically shows a cutout 600 in one of the stator laminations 202. The cutout may be formed by punching, stamping, drilling, or the like. In one example, the cutouts may be formed in the stator laminations 202 towards an outer periphery thereof and may be circumferentially distributed around the lamination stack in the stator. The cutouts may, in some cases, be polygonal (e.g., rectangular, square, and the like), though other shapes, such as round or oval shapes, have been contemplated. In some examples, adjacent stator laminations may have openings with a different shape or position, or may be similarly formed and positioned within the stator stack in a rotationally offset manner, so that the variation in shape and/or position creates a baffled layout within the oil ducts 230, 232, as depicted in FIGS. 2-4. For instance, adjacent laminations in the lamination stack may be formed with similarly shaped and sized cutouts, with the position of the cutouts alternating between a radially inward location and a radially outward location to form the baffled channel layout.

FIG. 3 illustrates baffles 310, 312 formed by adjacent stator laminations. The baffle 310 is specifically formed by a first stator lamination having a cutout that is arranged more radially outward (e.g., closer to a periphery of the stator lamination), and the baffle 312 is formed by a second stator lamination (adjacent to the first stator lamination) having a cutout that is arranged more radially inward. This pattern may be repeated throughout at least a portion of the stator laminations to form the oil ducts 230, 232. Using baffles in the oil ducts allows a longer oil flow path through the respective oil duct to be achieved. Consequently, the amount of heat transferred from the stator to the oil and from the oil to the water jacket 220 through the outer periphery of the stator may be increased. Using baffles in the oil ducts may also increase turbulence in the oil flow which may further increase the amount of heat transferred from the stator to the oil. However, other cutout arrangements that provide a generally baffled layout which forms a serpentine flow path through the oil ducts have been envisioned. For instance, the oil channels may be formed by a first set of sequential lamination cutouts that are positioned radial inward from a second set of sequential lamination cutouts.

The baffled oil duct layout increases the surface contact area between the oil and the stator laminations, thereby increasing a heat transfer coefficient to more effectively transfer heat from the stator to the oil. Thus, the cut-outs in the stator laminations may be profiled and arranged to realize a desired baffled duct layout that may satisfy different stator cooling demands. The motor may therefore achieve greater space efficiency than systems using oil cooling arrangements that are positioned exterior to the stator laminations.

In some examples, referring collectively again to FIGS. 2-4, the oil ducts 230, 232 may be formed in portions (e.g., peripheral sections) of the stator laminations 202. For instance, the oil ducts 230, 232 may extend in opposing axial directions from a radial opening 231 formed by the stator laminations. The radial opening 231 may be formed in a central portion of the stator laminations 202. To construct the radial opening 231 a portion of the stator laminations, which are centrally located, may have a smaller diameter than the outer laminations. In this way, the radial opening 231 may be efficiently formed (by altering the size of the selected stator laminations as desired) to provide a compact design for routing oil received in the radial opening toward both of the axially extending oil ducts 230, 232.

In order to provide oil to the radial opening 231 in the stator laminations 202, and thus the oil ducts 230, 232, the oil inlet 120 is mounted to the housing 110 in fluidic communication with the radial opening. In one example, the oil inlet 120 may be coupled via fasteners 242 (e.g., bolts, screws or the like) to the outer housing portion 216 and extend through both the outer housing portion 216 and the inner housing portion 214, so that a bore 240 (e.g., radially aligned bore) of the oil inlet 120 is aligned and in fluid communication with the radial opening 231. In some cases, since the radial opening 231 may be formed in a central portion of the stator laminations 202 (e.g., at an axial midpoint of the stator). The oil inlet 120 may be mounted to the housing so as to be positioned proximate a midpoint of the stator 200. In this way, oil may be distributed through the oil ducts 230, 232 to provide for more balanced cooling across the stator laminations 202. In other examples, however, the oil inlet and radial opening may be spaced away from the stator's axial mid-point. In such an example, the radial opening 231 in the stator laminations may be positioned accordingly to align with the bore 240 of the oil inlet 120.

In other examples, the oil inlet 120 and the coolant inlet 126 may be positioned on opposing axial sides (e.g., near opposing axial ends) of the stator laminations 202. In other words, the oil inlet may be positioned on the same axial side of the stator laminations as the coolant outlet 128. In this way, a counter flow pattern between the oil and the coolant may be established. As a result, the effectiveness of the heat transfer between the oil and the coolant can be increased. Specifically in certain instances, the coolant may flow in a spiraling pattern through the water jacket in an axial direction that is generally opposite the flow of oil through the stator laminations, effectively creating a counterflow arrangement. As such, the effectiveness of the heat transfer between the oil and the coolant may be increased. In such an example, the bore through the housing may be aligned with the oil inlet.

The flow path of coolant and the oil through the electric motor 100, as well as the thermal interaction between the oil and the coolant, will now be described with reference to FIGS. 2-4. First, oil may be picked up from an oil sump 250 at a lower portion of the housing 110, by the pump 116. The oil is then routed through the oil delivery line 118 into the bore 240 of the oil inlet 120. The bore 240 guides oil through the housing and into the radial opening 231 that is formed in the stator laminations 202. As such, the oil, which is fluidly separated from the water jacket 220, may flow through the outer housing portion 216, the water jacket 220, and the inner housing portion 214. Upon entering the radial opening 231, the oil may be routed in opposing axial directions through the baffled oil ducts 230, 232 towards opposing axial ends of the stator laminations 202 and towards the end windings 203, 204, respectively.

FIG. 3 illustrates an oil flow path 300 (indicated via arrows). The oil flow path travels through the bore 240 of the oil inlet 120, thus flowing through the inner and outer housing portions 214, 216 the housing 110, while fluidly separated from coolant in the water jacket 220, into the radial opening 231. In one example, the bore 240 of the oil inlet 120 may be larger than the each of the oil ducts 230, 232, such that the oil may increase in pressure as it enters the oil ducts from the radial opening 231. Next, the oil flow path 300 may radially pass through the bore 240 and the opening 231 and then move axially through the oil ducts 230, 232. Next the oil flow circuitously travels through the baffled oil ducts 230, 232. However, the direction of oil flow through the oil ducts 230, 232 may be generally in opposite axial directions. The use of the baffles in the oil ducts enable a serpentine flow path to be achieved. As a result, greater stator cooling may be achieved in comparison to linear oil ducts. As shown in FIG. 3, seals 302 may be provided between the oil inlet 120 and the housing 110.

Turning to FIG. 4, an arrow 400 represents the general direction of the flow of coolant through the water jacket 220 between the outer housing portion 216 and the inner housing portion 214. However, the flow pattern of the coolant has greater complexity than is captured by the arrow 400. For instance, coolant may enter the coolant channels 223 (via the coolant inlet 126 in FIG. 1) and move through the somewhat circumferentially arranged coolant channels before exiting the housing (via the coolant outlet 128 in FIG. 1). The coolant flowing through the water jacket may thus remove heat from the oil in the oil ducts 230, 232, such that heat from the oil is thermally conducted to the coolant through the inner housing portion 214. As further shown in FIG. 4, seals 402 may be arranged between the inner and outer housing portions 214, 216. In this way, the chance of coolant leaks from the water jacket may be reduced.

In one example, spray rings 404, 405 may be positioned at opposing axial ends of the stator laminations 202. As illustrated in FIG. 4, the spray ring 404 may include an opening 406 extending therethrough for directing the oil flow 300 from the oil duct 232 towards end windings extending from the stator laminations (e.g., end windings 204 depicted in FIG. 2), as indicated via arrow 408. In some cases, the opening 406 may be contoured as a nozzle which sprays oil towards the end windings. Further, it will be understood that the spray ring 405 may have a similar opening or nozzle for directing oil from the oil duct 230 towards the end windings extending from the stator laminations on the opposite axial end thereof.

In other examples, the spray rings 404, 405 may not include an opening. As such, the spray rings may serve as collector rings (or plates), whereby oil flowing through the respective oil ducts 232, 230 may be collected in respective spaces which are defined radially outward of the ring within the housing 110. For example, oil flowing through the oil duct 232 may be collected in a cavity 410 radially outward from the ring 404, in the design where the opening 406 is not present. Further, in some cases, the cavity 410 may be in fluidic communication (e.g., direct fluidic communication) with a component 413 (e.g., a gearbox, an inverter, and/or other electric drive unit components) that receives oil for cooling and/or lubrication. Thus, a hydraulic line may be fluidly coupled to the cavity 410 (e.g., through the housing 110) so as to provide a flow path generally represented by arrow 412 for routing oil to the lubricated component 413. For instance, a hydraulic line may be hydraulically coupled to the cavity formed above the ring and route oil collected therein to another component. In this way, the oil may be effectively used to cool and/or lubricate other components in an electric drive unit in an efficient manner. In some examples, such as when the oil inlet is positioned at one axial end, it will be understood that one collector ring may be positioned at an axial end of the stator laminations opposite the axial end at which the oil inlet is located.

In some examples, the stack of stator laminations 202 of the stator 200 may be press-fit into the housing 110, so that an interface 255 is formed between the outer surface 254 of the stator 200 and an inner surface 256 of the inner housing portion 214. The interference fit allows the stator 200 to be held securely within the housing 110 (e.g., within the inner housing portion 214). Further, the press-fit interface may allow for increased thermal conduction between the coolant in the water jacket 220 in the housing 110 and the oil flowing through the oil ducts 230, 232 in the stator 200 to be achieved. In some examples, the cutouts in the stator laminations 202 that form the oil ducts 230, 232 may be positioned near an outer periphery of the stator laminations and the press-fit interface to increase the amount of heat removed from the oil.

To further increase the heat transfer coefficient at the interface 255, a thermal interface material (TIM) 257 may be included at the interface (e.g., press-fit interface) to reduce the thermal resistance between the water jacket 220 and the stator laminations 202. In one example, the TIM may be a thermally conductive epoxy or a silicone-based adhesive which may cure into a solid state. In other examples, the TIM may be a thermal film (which may include a silicone or polyimide), thermal paste, thermal tape, phase change material, or other material or combination of materials that are capable of increasing the heat transfer between the surface of the stator 200 and the inner housing portion 214. In this way, a space efficient system for cooling the oil flowing through the electric motor 100 is realized, without the use of an external heat-exchanger for removing heat from the oil, if wanted. Consequently, the overall weight and size of the electric motor may be reduced. This compact cooling system may be utilized in a variety of electric motor applications such as in tightly packaged powertrains, electric axles, and the like.

Referring again to FIG. 2, as the oil flows axially outward through the oil ducts 230, 232 towards the opposing axial sides of the stator lamination stack, heat may be removed from the oil by the coolant flowing through the coolant channels 223. Then, oil may be distributed to the end windings 203, 204 for cooling by way of the spray rings 404, 405, in some examples. By flowing oil to the opposing end windings, the chance of uneven cooling of the end windings may be reduced. As a result, the efficiency and longevity of the motor may be increased. Upon reaching the end windings 203, 204, the oil may flow through the electric motor, past the rotor 210 the rotor shaft 212, bearings, etc., so as return by gravity to the sump 250. In this way, an oil cooling loop is formed in the motor.

FIGS. 1-6 provide for a cooling system operating method. The method includes flowing coolant through a water jacket in a housing directly coupled to a stator. The method further includes flowing oil through an oil inlet that extends through the water jacket. In said method, the oil flow is separated from the coolant flow in the water jacket. Next, the method includes flowing oil from the oil inlet to one or more axially extending oil ducts that traverse at least a portion of a plurality of stator laminations. For instance, flowing the oil from the oil inlet may include flowing the oil through a radial opening that extends through the housing in an oil pathway that is fluidly separated from the coolant in the water jacket. The method further includes thermally conducting heat from the oil to the water jacket through a wall in the housing. In this way, the coolant in the water jacket may act as a compact and efficient heat exchanger for the oil circuit. Consequently, oil may flow into the inlet directly from an oil pump without passing through an external heat exchanger. Further, since the interior surface of the housing may form a press-fit interface with an outer surface of the stator, the heat transfer coefficient of the cooling system may be significantly increased over previous systems. Further in certain examples, the press-fit interface may be further enhanced by providing a TIM in the interface, as previously discussed. In additional examples, the method may further include flowing oil directly from a collector ring that is positioned adjacent to an axial end of the plurality of stator laminations to a gearbox.

The technical effect of the cooling system operating method described herein is to efficiently transfer heat from oil cooling channels that traverse stator laminations to a water jacket using a compact arrangement. Consequently, a desired amount of motor cooling can be achieved in a space efficient package, thereby increasing motor efficiency.

FIGS. 1-6 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

The invention will be further described in the following paragraphs. In one aspect, an electric drive unit is provided that comprises an electric motor including a housing including a water jacket arranged therein; a stator including a plurality of stator laminations positioned within the housing; an oil inlet mounted to and extending through the housing; wherein the plurality of stator laminations includes a radial opening that is designed to: receive oil from the oil inlet; and direct oil to one or more oil ducts axially extending through at least a portion of the plurality of stator laminations.

In another aspect, an electric motor is provided that comprises a housing comprising a water jacket arranged therein; a stator comprising a plurality of stator laminations with a peripheral surface forming an interface with the housing; an oil inlet mounted to and extending through the housing; wherein the plurality of stator laminations include a radial opening designed to: receive oil from the oil inlet; and direct the oil to a plurality of oil ducts axially extending through at least a portion of the plurality of stator laminations; wherein the plurality of oil ducts have a plurality of baffles; an oil sump coupled to the housing and configured to receive oil from the plurality of oil ducts; and an oil pump including an inlet in fluidic communication with the oil sump; wherein an oil line extends directly from an outlet of the oil pump and the oil inlet.

In yet another aspect, a method for an electric motor cooling system is provided that comprises flowing coolant through a water jacket in a housing directly coupled to a stator; flowing oil through an oil inlet extending through the water jacket and fluidly separated from the coolant in the water jacket; flowing the oil from the oil inlet to one or more axially extending oil ducts that traverse at least a portion of a plurality of stator laminations; and thermally conducting heat from the oil to the water jacket through a wall in the housing. In one example, the method may further comprise flowing the oil from the one or more axially extending oil ducts to a spray ring; and flowing the oil from the spray ring to an end winding through an opening in the spray ring. In another example, the method may further comprise collecting the oil from the end winding in an oil sump; flowing the oil from the oil sump to an oil pump; and flowing the oil directly from the oil pump to the oil inlet without passing through a heat exchanger. In yet another example, flowing the oil from the oil inlet to the one or more axially extending oil ducts may include flowing the oil through a radial opening that extends through the housing, is fluidly separated from the coolant in the water jacket, and is positioned axially between two of the axially extending oil ducts. In still another example, an interior surface of the wall may form a press-fit interface with an outer surface of the stator.

In any of the aspects or combinations of the aspects, the water jacket may include one or more coolant channels with an inner periphery defined by an outer surface of a housing wall; an inner surface of the housing wall may be in face sharing contact with a peripheral surface of the stator; and the one or more oil ducts may have a plurality of baffles.

In any of the aspects or combinations of the aspects, the electric drive unit may further comprise a spray ring designed to receive the oil from the one or more oil ducts.

In any of the aspects or combinations of the aspects, the spray ring may include an opening that directs the oil to an end winding in the stator.

In any of the aspects or combinations of the aspects, the electric drive unit may further comprise an oil sump coupled to the housing and in fluidic communication with an oil pump that includes an outlet in fluidic communication with the oil inlet.

In any of the aspects or combinations of the aspects, the outlet may be in direct fluidic communication with the oil inlet via a coolant line.

In any of the aspects or combinations of the aspects, the electric drive unit may not include an external oil cooler.

In any of the aspects or combinations of the aspects, the one or more oil ducts may include two ducts that extend from the radial opening in opposing axial directions.

In any of the aspects or combinations of the aspects, the electric drive unit may further comprise a thermal interface material arranged between the plurality of stator laminations and the housing.

In any of the aspects or combinations of the aspects, a press-fit interface may be formed between the housing and the stator.

In any of the aspects or combinations of the aspects, the electric motor may be a traction motor in a vehicle.

In any of the aspects or combinations of the aspects, the electric motor may further comprise a collector ring positioned at an axial end of the stator laminations and designed to collect oil in a cavity between the collector ring and the housing, and a hydraulic line in fluidic communication with the space and a gearbox.

In any of the aspects or combinations of the aspects, the interface may be a press-fit interface with a thermal interface material designed to reduce a thermal resistance of the interface.

In any of the aspects or combinations of the aspects, the plurality of baffles may extend in radial directions.

In any of the aspects or combinations of the aspects, the ring may be a collector ring and the electric drive unit further comprises an oil line that extends from the collector ring to a gearbox.

In any of the aspects or combinations of the aspects, the electric motor further comprises a collector ring positioned at an axial end of the stator laminations and designed to collect oil in a cavity between the collector ring and the housing; and a hydraulic line in fluidic communication with the cavity and a gearbox.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations, and/or functions may be repeatedly performed depending on the particular strategy being used. Further, the described actions, operations, and/or functions may graphically represent code to be programmed into non-transitory memory of the computer readable storage medium in the engine control system, where the described actions are carried out by executing the instructions in a system including the various engine hardware components in combination with the electronic controller.

As used herein, the terms "approximately" and "substantially" are construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. An electric drive unit, comprising:
an electric motor including:
a housing including a water jacket arranged therein;
a stator including a plurality of stator laminations that are positioned within the housing;
an oil inlet mounted to an outer wall of the housing via multiple fasteners; and
a plurality of seals provided between the oil inlet and the housing;
wherein the oil inlet extends radially outward from the outer wall;
wherein the oil inlet extends through the outer wall, an inner wall of the housing, and the water jacket;
wherein the plurality of stator laminations include a radial opening that is designed to:
receive oil from the oil inlet; and
direct oil to one or more oil ducts that axially extend through at least a portion of the plurality of stator laminations;
wherein the inner wall is positioned radially inward from the water jacket and the outer wall is positioned radially outward from the water jacket;
wherein a working fluid in the water jacket includes water and the working fluid in the oil inlet and the one or more oil ducts is oil; and
wherein the water jacket is fluidly separated from the oil inlet and the one or more oil ducts.

2. The electric drive unit of claim 1, wherein:
the water jacket includes one or more coolant channels with an inner periphery defined by an outer surface of the inner wall;
an inner surface of the inner wall is in face sharing contact with a peripheral surface of the stator; and
the one or more oil ducts have a plurality of baffles.

3. The electric drive unit of claim 1, further comprising a ring designed to receive the oil from the one or more oil ducts.

4. The electric drive unit of claim 3, wherein the ring is a spray ring that includes an opening that directs the oil to an end winding in the stator.

5. The electric drive unit of claim 1, wherein the electric motor does not include an external oil cooler.

6. The electric drive unit of claim 1, wherein the one or more oil ducts include two ducts that extend from the radial opening in opposing axial directions.

7. The electric drive unit of claim 1, further comprising a thermal interface material arranged between the plurality of stator laminations and the housing.

8. The electric drive unit of claim 1, wherein a press-fit interface is formed between the housing and the stator.

9. The electric drive unit of claim 1, wherein the electric motor is a traction motor in a vehicle.

10. A method for an electric motor-cooling system comprising:
flowing a coolant which includes water through a water jacket in a housing that is directly coupled to a stator;
flowing oil through an oil inlet that extends through the water jacket and an inner wall and an outer wall of the housing;
flowing the oil from the oil inlet to one or more axially extending oil ducts that traverse at least a portion of a plurality of stator laminations; and
thermally conducting heat from the oil to the water jacket through the inner wall in the housing;
wherein the oil inlet extends radially outward from the outer wall;
wherein the oil inlet is coupled to the outer wall via multiple fasteners;
wherein the inner wall is positioned radially inward from the water jacket and the outer wall is positioned radially outward from the water jacket;
wherein a working fluid in the water jacket includes water and the working fluid in the oil inlet and the one or more axially extending oil ducts is oil;
wherein the water jacket is fluidly separated from the oil inlet and the one or more axially extending oil ducts;
wherein a plurality of seals are provided between the oil inlet and the housing; and
wherein the oil inlet extends through the outer wall, the inner wall, and the water jacket.

11. The method of claim 10, further comprising:
flowing the oil from the one or more axially extending oil ducts to a spray ring; and
flowing the oil from the spray ring to an end winding through an opening in the spray ring.

12. The method of claim 11, further comprising:
collecting the oil from the end winding in an oil sump;
flowing the oil from the oil sump to an oil pump; and
flowing the oil directly from the oil pump to the oil inlet without passing through a heat exchanger.

13. The method of claim 10, wherein flowing the oil from the oil inlet to the one or more axially extending oil ducts includes flowing the oil through a radial opening that extends through the housing and is positioned axially between two of the axially extending oil ducts.

14. An electric motor, comprising:

a housing including a water jacket;

a stator including a plurality of stator laminations with a peripheral surface that forms an interface with the housing;

an oil inlet mounted to an outer wall of the housing via multiple fasteners;

wherein the oil inlet extends through the outer wall, an inner wall of the housing, and the water jacket; and a plurality of seals provided between the oil inlet and the housing;

wherein the plurality of stator laminations include a radial opening designed to:

receive oil from the oil inlet; and direct the oil to a plurality of oil ducts axially extending through at least a portion of the plurality of stator laminations;

wherein the plurality of oil ducts have a plurality of baffles;

an oil sump coupled to the housing and configured to receive the oil from the plurality of oil ducts; and an oil pump including an inlet in fluidic communication with the oil sump;

wherein an oil line extends directly from an outlet of the oil pump to the oil inlet;

wherein the inner wall is positioned radially inward from the water jacket and the outer wall is positioned radially outward from the water jacket;

wherein a working fluid in the water jacket includes water and the working fluid in the oil inlet and the plurality of oil ducts is oil; and wherein the water jacket is fluidly separated from the oil inlet and the plurality of oil ducts.

15. The electric motor of claim 14, wherein the interface is a press-fit interface with a thermal interface material designed to reduce a thermal resistance of the interface.

16. The electric motor of claim 14, wherein the plurality of baffles extend in radial directions.

\* \* \* \* \*